Figure 2:
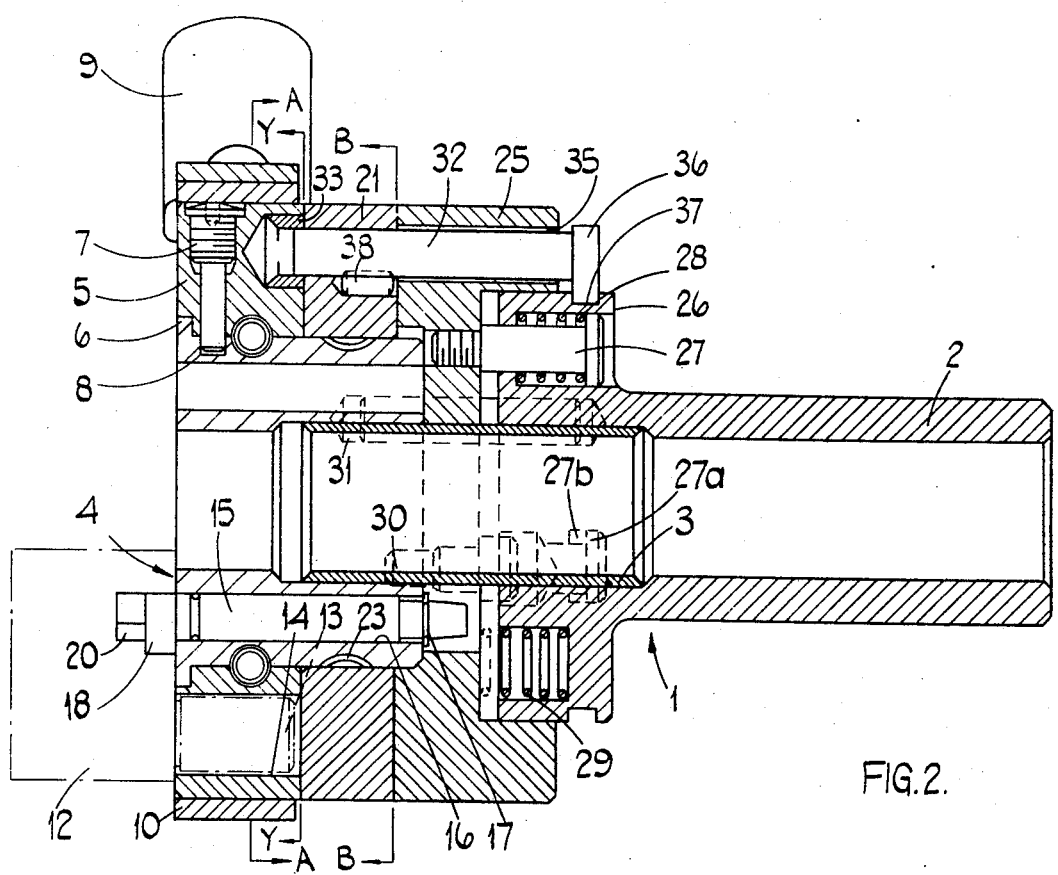

United States Patent [19]
Newell et al.

[11] 3,977,032
[45] Aug. 31, 1976

[54] SCREW-THREADED CUTTING DIEHEADS

[75] Inventors: Denis Alfred Newell, Coventry; Kenneth Atkins, Bulkington nr. Nuneaton; Brian Dudley Harper, Coventry, all of England

[73] Assignee: Alfred Herbert Limited, Coventry, England

[22] Filed: Apr. 17, 1975

[21] Appl. No.: 568,894

[30] Foreign Application Priority Data
Apr. 27, 1974 United Kingdom............. 18543/74

[52] U.S. Cl. .................... 10/96 R; 10/100; 10/121; 408/148; 408/153; 408/178
[51] Int. Cl.²................... B23G 1/28; B23G 5/12
[58] Field of Search ............. 10/94, 100, 120, 121, 10/89 H, 96 R; 408/148, 149, 153, 173, 177, 178, 180

[56] References Cited
UNITED STATES PATENTS

| | | |
|---|---|---|
| 1,979,024 | 10/1934 | Bysshe et al. .................. 408/148 |
| 3,580,690 | 5/1971 | McClure ........................ 408/178 |
| 3,681,802 | 8/1972 | Youtz et al. ...................... 10/96 |
| 3,696,454 | 10/1972 | Youtz et al. .................. 408/148 |
| 3,731,329 | 5/1973 | Youtz et al. ..................... 10/121 |

*Primary Examiner*—C.W. Lanham
*Assistant Examiner*—E. M. Combs

[57] ABSTRACT

A diehead for use on a machine tool for cutting screw threads and having thread chaser carriers mounted on a body for pivotal movement about spaced parallel axes, means being provided for pivoting the carriers through a range of movement between operative and inoperative positions. The diehead includes locking means arranged so as normally to retain the carriers in position in the body and to permit removal of the carriers in an axial direction when they are pivoted beyond said range of movement.

14 Claims, 11 Drawing Figures

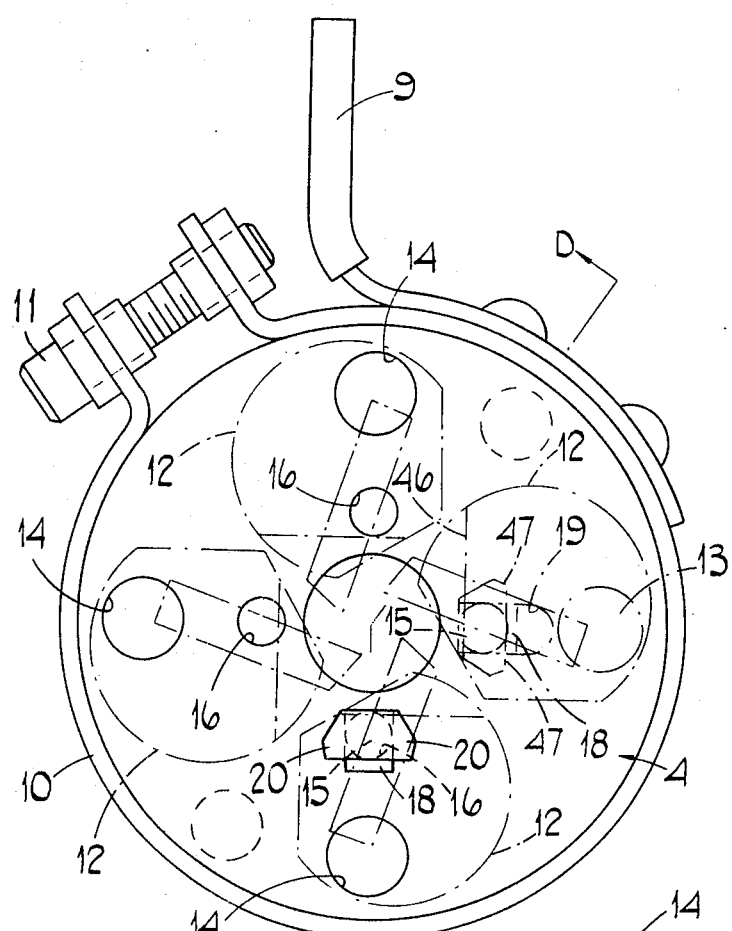
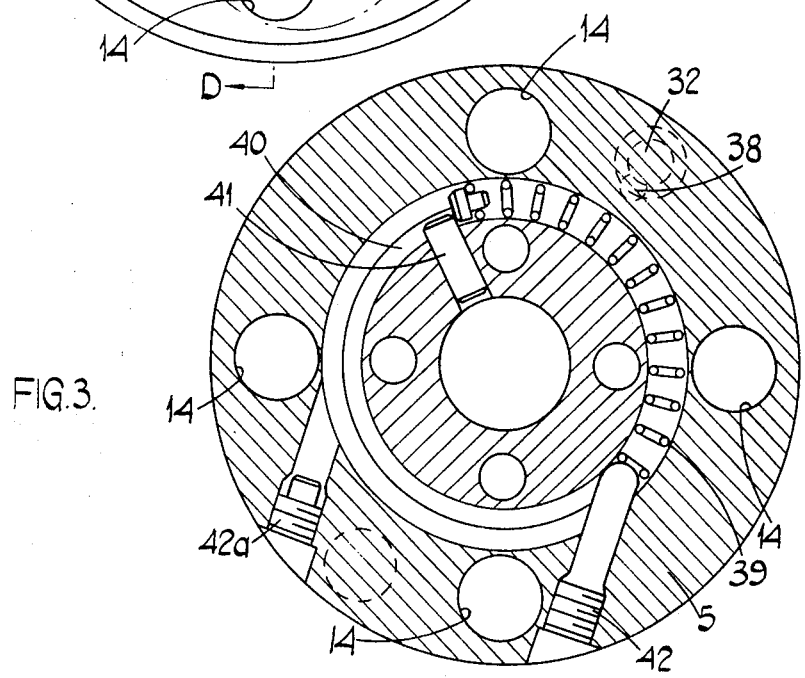

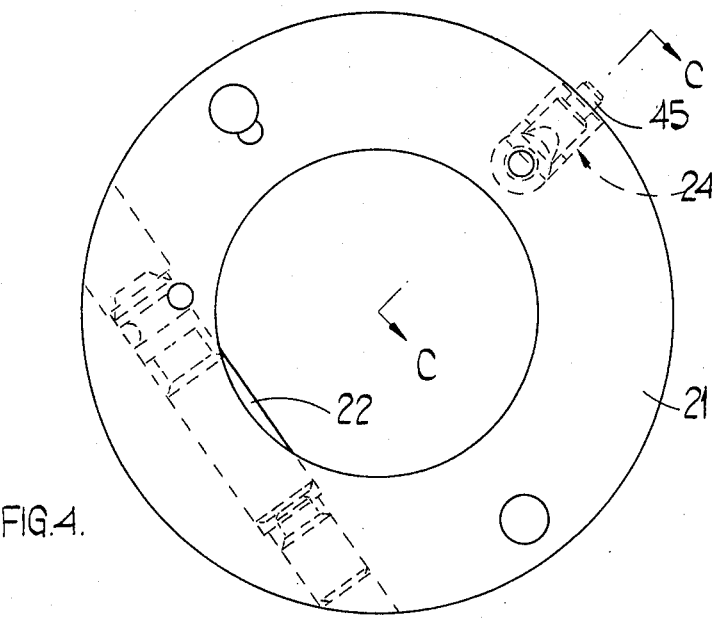
FIG.4.
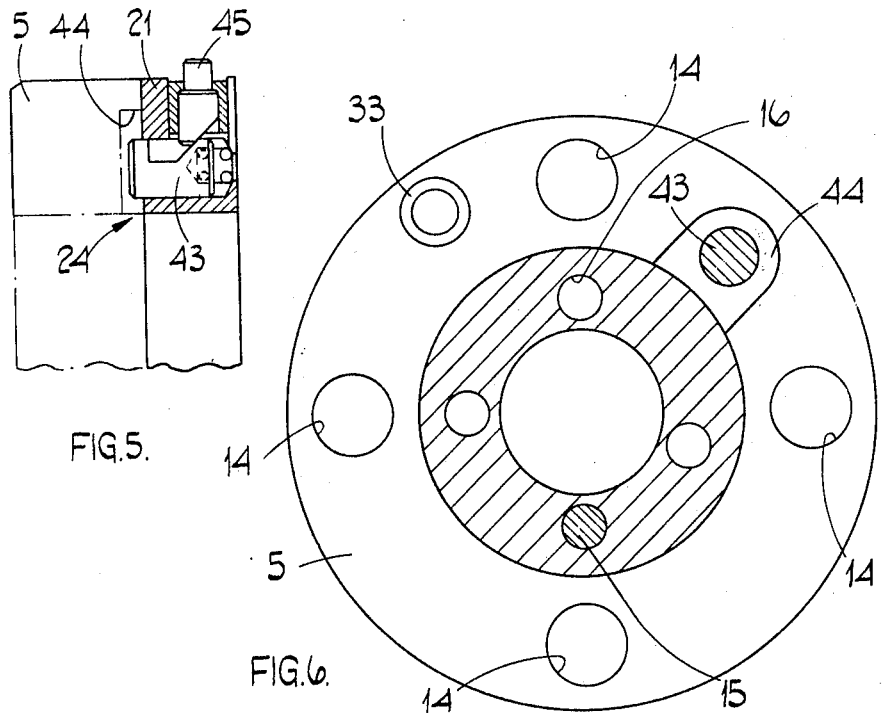
FIG.5.
FIG.6.

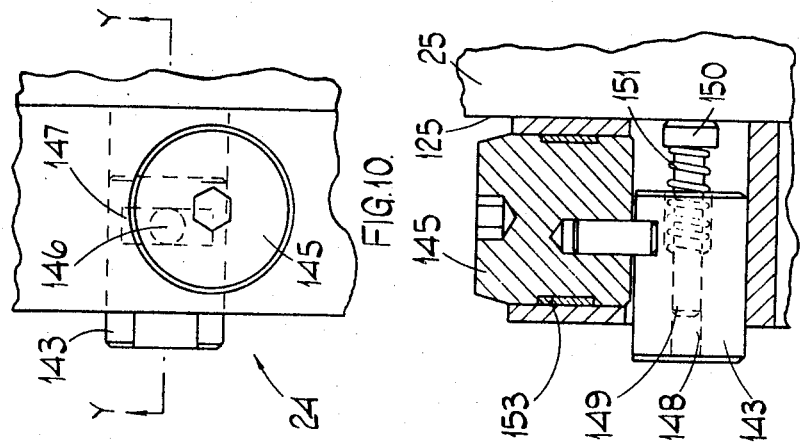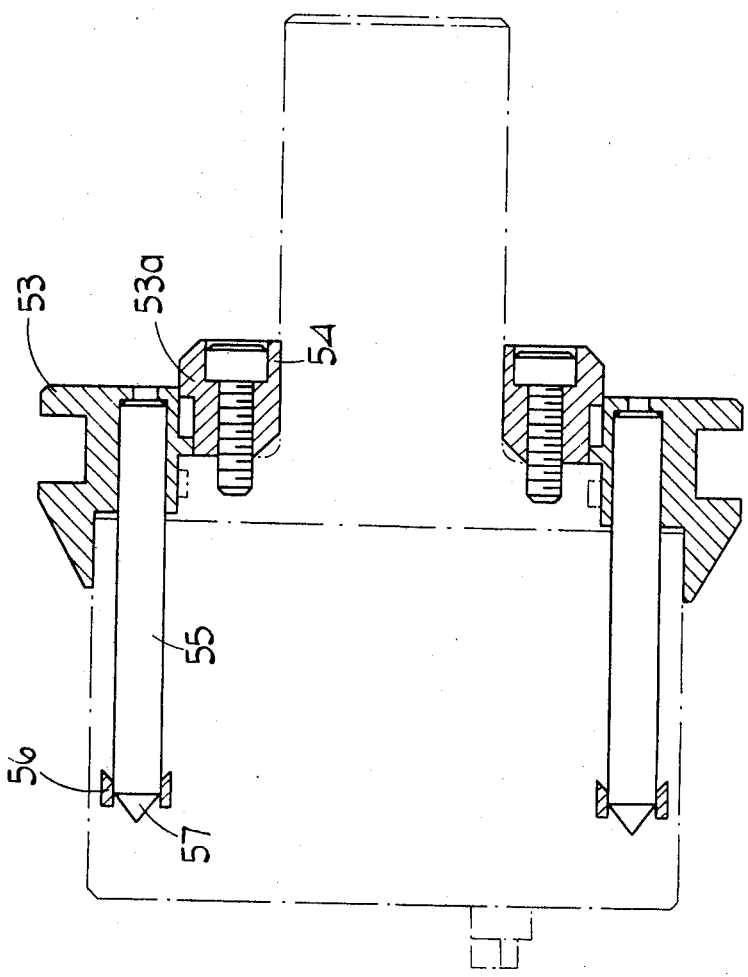

SCREW-THREADED CUTTING DIEHEADS

This invention relates to die heads for cutting screw threads and of the kind (hereinafter referred to as "the kind specified") comprising a body, a plurality of thread chaser carriers mounted for pivotal movement relative to the body about spaced parallel axes and means for pivotally displacing said carries over a range of movement between operative and inoperative positions.

It is frequently necessary with such dieheads to remove the carriers in order to change the thread chasers, due for example to the chasers becoming worn, or because it is desired to change to a different thread. An object of the present invention is to provide a die head of the kind specified in which the chaser carries may be readily removed and replaced when desired.

According to the invention, there is provided a die head of the kind specified which includes locking means arranged so as normally to prevent removal of the carriers but to permit such removal when the carriers are pivotally displaced beyond said range of movement.

Conveniently the carriers are arranged to be released by said locking means for removal when pivotally displaced beyond their inoperative positions.

The carriers may be supported on a face of the body extending perpendicularly to the carrier pivotal axes and the locking means preferably co-operate with the carriers adjacent said face.

Preferably, the carriers are pivotally mounted on an actuating member which is angularly movable about the diehead axis, the carriers co-operating with respective elements pivoted on the body about axes parallel to the carrier pivotal axes and which constitute the locking means, the arrangement being such that angular movement of the member causes said pivotal displacement of the carriers.

Advantageously, a releasable detent mechanism is provided for normally preventing pivotal movement of the carriers beyond said range of movement.

The invention will now be described, by way of example, with reference to the accompanying drawings in which:-

Figure 8:
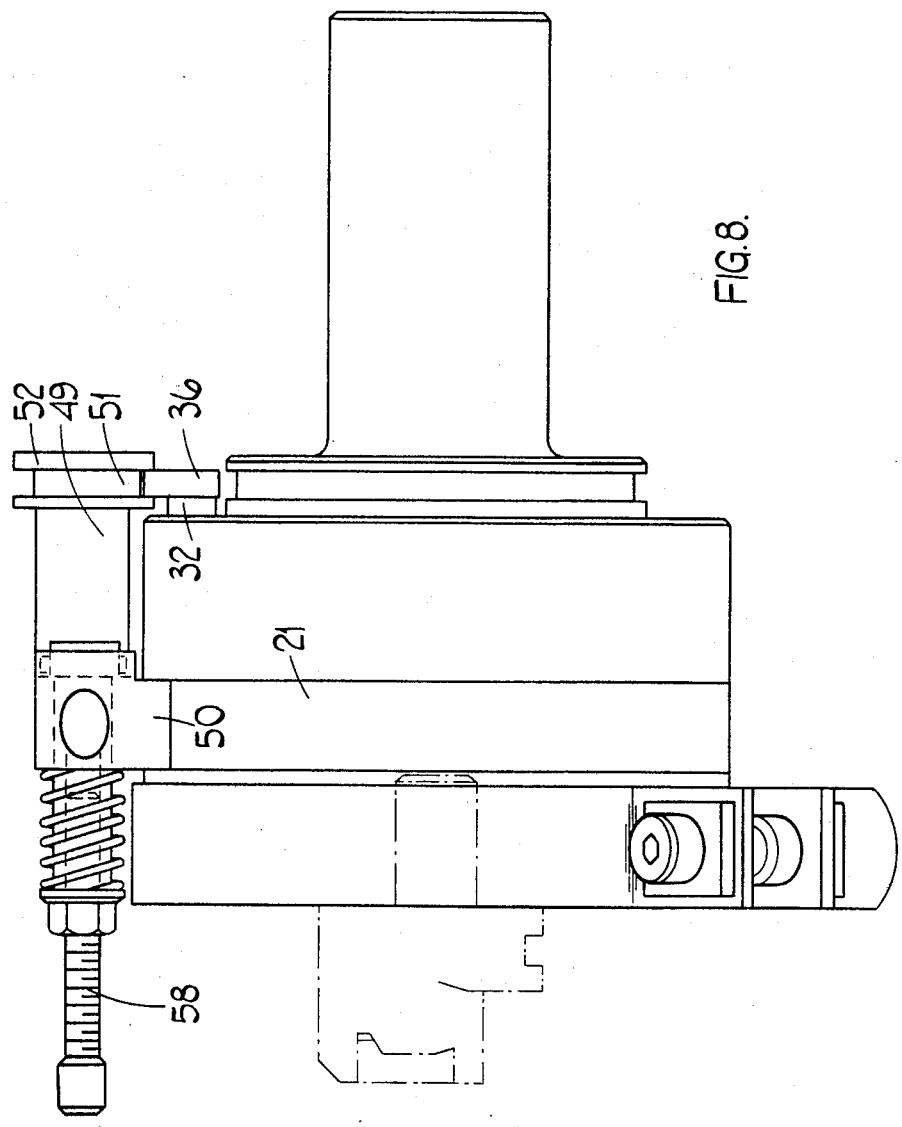
Figure 7:
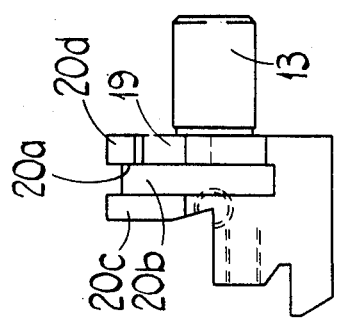

FIG. 1 is an end elevation of one form of diehead of the invention;
FIG. 2 is a section along the line D—D of FIG. 1;
FIG. 3 is a section along the line A—A of FIG. 2;
FIG. 4 is an view along the line B—B of FIG. 2;
FIG. 5 is a section along the line C—C of FIG. 4;
FIG. 6 is a view along the line Y—Y of FIG. 2;
FIG. 7 is a detail of a chaser carrier;
FIG. 8 is an elevation of a modified form of the invention;
FIG. 9 is a part sectional view of another example of the invention:
FIG. 10 shows a modification of part of the dieheads shown in FIGS. 1 to 9, and
FIG. 11 is a cross-section taken along the line Y—Y of FIG. 10.

Referring to FIGS. 1 to 7 of the drawings, the diehead shown includes a shank member 1 having a tubular shank 2, by means of which the diehead may be mounted on a tool turret in the usual manner, and a tubular co-axial spigot 3 pressed into the shank member 1 for rotation therewith. A generally annular body 4 is mounted on the free end portion of the spigot 3 for axial sliding movement relative to shank member 1. A ring 5 is mounted on the left-hand end portion of the body 4 against a radial flange 6 on the body, the ring 5 being angularly movable on the body to the extent limited by a radially extending peg 7 screwed into the ring and engaging a circumferential groove 8 in the body. Angular movement of the ring 5 is, in this case, effected manually by means of a handle 9 secured to a clamping ring 10 surrounding the ring 5, clamping being effected by means of a bolt 11 between the free ends of the ring.

A plurality of chaser carriers 12 are pivotally mounted on the ring 5, each by means of a respective eccentric stem 13 engaged in a complementary bore 14 in the ring so that the carriers 12 are pivotable about spaced axes parallel to the longitudinal axis of the diehead. A corresponding number of pins 15 are arranged at spaced locations around the body 4 in respective bores 16 parallel to the bores 14, the pins being retained in the bores 16 by circlips 17. Each of the pins has a rectangular radial projection 18 extending towards the carrier pivotal axis and slidably engaging in a corresponding slot 19 in the adjacent chaser carrier 12, the arrangement being such that when the ring 5 is moved angularly, carrying the carriers 12 around the diehead axis, co-operation of the projections 18 with the slots 19 causes rotation of the pins 15 in their bores 16 accompanied by sliding of the projections in the slots, and consequent rotation of the carriers 12 and their stems 13 in the bores 14. The pins 15 also carry extending wings 20 disposed at right angles to the projections 18 and which normally prevent withdrawal of the chaser carriers.

An adjusting ring 21 is mounted on the body 4 and carries a worm adjuster 22 which co-operates with a worm 23 formed on the body 4. The ring 21 also carries a release mechanism 24 for the carrier chasers which will be described in more detail hereinafter.

The body 4 and ring 21 are connected to the shank member 1 by means of an intermediate ring 25. The ring 25 surrounds and slidably engages a radial flange 26 of the shank member 1. The shank member and intermediate ring are connected together by means of four headed bolts 27 spaced around the diehead axis and screwed into the intermediate ring 25. Alternate ones of the bolts are provided with springs 28 disposed in recesses in the flange 26 and which act between the bolt heads and bottoms of the recesses to resist relative axial movement in one direction between the ring 25 and shank member 1. The other pair of bolts 27a have no springs and act as positive dead length stops in recesses 27b. A pair of further springs 29 in diametrically opposed recesses in the flange 26 act between this flange and a face of the ring 25 in opposition to the springs 28. The springs 28 and 29 are normally in equilibrium andd permit some axial floating to take place between the shank and the remainder of the diehead to compensate for any small discrepancies which may arise between the pitch of thread and feed of the machine during a threading operation. The ring 25 is rigidly secured to the body 4 by means of a pair of diametrically opposed screws 30 engaging in tapped holes in the body 4. The body 4 is also connected to the shank member 1 by two dowels 31 equally spaced around the die axis and engaging in bores in the body and shank member. The dowels serve to transmit rotational driving forces between the shank member and body 4.

The carriers 12 are held in their operative positions during a machining operation by means of a detent pin 32 which is engageable, as shown, in a socket formed by a bush 33 in the ring 5. The detent pin 32 extends through arcuate slots 35 in the intermediate ring 25. The pin 32 has a flange 36 at one end engaging in a circumferential groove 37 in the flange 26 of the shank member 1. The pin 32 is prevented from rotation by a pin 38 engaging in a groove therein.

The release mechanism 24 includes a spring loaded plunger 43 urged into engagement with a recess 44 in the ring 5. The plunger co-operates with a radially slidable button 45 mounted in the ring 21, the plunger and button having co-operating bevelled surfaces whereby pressure on the button will cause withdrawal of the plunger from the recess 44. Engagement of the plunger 43 in the recess 44 limits angular movement of the ring and thus sets the inoperative positions of the carriers.

The ring 5 is urged in a clockwise direction, as seen in FIG. 3, by a spring 39 in an arcuate slot 40 formed partly in the ring 5 and partly in the body 4. The spring acts between a peg 41 projecting radially from the body 4 and the inner end of a removable screwed plug 42 in the ring 5. A similar plug 42a is provided for inserting the spring against an opposite portion of the peg 41 for reverse rotation of the diehead.

When the pin 32 is engaged in the bush 33, the carriers are in their operative positions with the spring 39 stressed and applying a force to the ring 5 which would urge it in a clockwise direction but for the engagement of the pin and bush.

Operation of the diehead is as follows. Commencing with the diehead components in the positions as shown in the drawings, the carriers are in their operative positions and thread cutting proceeds until the required length of thread has been cut. The carriers are then returned to their inoperative positions, by stopping axial movement of the turret and allowing rotation of the diehead to continue. The carriers continue to be drawn to the left as seen in the drawings, carrying with them the rings 5, 21 and 25 and body 4, the springs 28 being compressed during this movement and the springs 29 relieved. Since the right-hand end of the pin 32 is anchored by means of the flange 36 and groove 37 to the shank member 1, the left-hand end of the pin 32 will become disengaged from the bush 33 after a certain leftward movement of the diehead parts has taken place, thus freeing the ring 5 to return, under the action of the spring 39 to an angular position set by plunger 43 engaging a side of recess 44 causing the carriers to pivot to their inoperative positions. During angular movement of the ring to the inoperative position, the free end of the pin 32 rides against the inner face of the ring 5. The carriers can be returned to their operative positions at the beginning of a subsequent threading operation by operating the handle 9 to rotate the ring 5 until the pin 32 once more engages in bush 33.

During movement of the carriers between their operative and inoperative positions, axial movement of the carriers is prevented by the wings 20 on the pins 15 which lie in a gap 20b between parallel portions 20c and 20d of the carrier and bridge the slot 19, engaging a face 20a of the carrier adjacent the slot (FIG. 7). To permit removal of the chaser carriers from the diehead, the button 45 of the release device is pressed to push the plunger out of the recess 44, thereby permitting the spring 39 to turn the ring 5 to a new limit position set by pin 7 and slot 8, beyond the normal range of movement of the ring. As the carrier moves angularly on its stem 13, the rectangular portion 18 moves along the slot 19 towards the open end of the latter. When the carrier has moved angularly to said new limit position, the edge 46 thereof moves clear of the edge 47 of each of the wings 20 and the stem 13 of the carrier can then be withdrawn from the bore 14 in an axial direction. The carrier can be replaced, or a different one fitted, and locked into position by once more moving the ring 5 angularly until the carrier is again within the range of movement between its operative and inoperative positions, the plunger 43 then re-engaging the recess 44 under spring action. The invention thus provides a very simple and effective way of releasably mounting the carriers which can readily be de-mounted without dismantling the diehead.

In the alternative embodiment shown in FIG. 8, the diehead is arranged for automatic release of the carriers to their inoperative positions at the end of a screw cutting operation. For this purpose, there is provided a spring-load plunger 49 slidable in a bracket 50 secured to the ring 21, the plunger 49 having an adjustable end screw 58. In this embodiment, the flange 36 of the pin 32 extends upwardly into a groove 51 formed in a boss 52 of the plunger 49. An abutment is positioned on the machine frame so that it is contacted by the plunger 49 at the end of a threading operation, movement of the plunger to the right as seen in the drawing withdrawing the pin 32 from the bush 33 as before to permit release of the ring 5 to its inoperative position. The carriers can be removed after pressing button 45 as before, the internal components of the diehead being the same as in FIGS. 1 to 7.

FIG. 9 shows the invention applied to a rotary diehead which is arranged for automatic operation by a yoke mechanism (not shown). A sleeve 53 surrounds and is slidably mounted on an end portion of the diehead, its movement being limited in one direction by the shank and in the other direction by a radial flange 53a on a fixed end piece 54. The sleeve has a pair of diametrically opposed pins press fitted into bores therein and extending so as normally to engage recesses 56 in a ring 5 as before. The free ends 57 of the pins are tapered, as are the mouths of the recesses. The sleeve is moved to the right, as a result of the yoke mechanism striking the abutment as before and the pins are withdrawn into the tapered mouths of the recesses to permit rotation of the ring to its inoperative position. The pins are self locating by the action of the tapers and are carried back into the recesses upon movement of the yoke mechanism moving the sleeve 53 from right to left. Although the shank of FIG. 9 is resiliently connected to the remainder of the diehead, as in the previous embodiments. to provide some float, a rigid connection would be possible.

A facility for providing both fine and coarse threading may conveniently be incorporated in the diehead of the invention by forming the end portion of the pin 32 engaging the recess 33 in an eccentric manner (usually by reducing the diameter over a part only of the circumference of the pin). By arranging for the pin to be turned through 180°, the combined action of the spring 39 and eccentric will cause the ring 5 to assume two different angular positions, resulting in alternative operative positions of the dieheads for fine and coarse threading respectively.

FIGS. 10 and 11 illustrate an alternative form of the release mechanism 24. The slidable button 45 is replaced by a rotatable spigot 145 which is coupled by means of an eccentric pin 146 to a plunger 143 engagement of the pin in a groove 147 of the plunger. The plunger 143 has a bore 148 which receives a headed pin 149, between the head 150 of which and an internal shoulder formed around the bore 148 acts a spring 151. The head 150 lies against and end surface 125 of the intermediate ring 25 so that the plunger 143 is urged towards its locking position in engagement with the recess 44 of the ring 5. The plunger 143 is formed with a flat 152 which co-operates with the inner end of the spigot 145 to prevent rotation of the plunger. Resistance to axial movement of the spigot 145 is provided by a circular retaining spring 153 housed in an annular groove in the outer surface of the spigot 145 and bearing against the wall of the opening housing the spigot to provide the necessary frictional resistance. The spigot can be turned by insertion of a suitable key in a hole provided in its outer end, and by turning the spigot 145 in a clockwise direction as seen in FIG. 10, the plunger 143 will be moved to the right and become withdrawn from engagement with the recess 44, enabling the spring 39 to turn the ring 5 to a new limit position, set by the pin 7 and slot 8, beyond the normal range of movement of the ring. The carriers can then be axially removed as before. The plunger 143 is automatically returned to its locking position by the spring 151 when the carriers are returned to a position between their operative and inoperative positions as described above.

In a modification of the release mechanism of FIGS. 10 and 11, the spring 153 may be omitted and the spigot may be of stepped form with a smaller diameter outer portion extending through a bush press-fitted into a radial recess in the ring 21, the bush retaining the spigot against outward radial movement by engaging a larger diameter inner portion thereof.

In a further modification of the release mechanism of FIGS. 10 and 11, the spring 153 is replaced by a self locking ring having portions bent out of the plane thereof so that when the ring is pressed into the recess housing the spigot 145, said portions tend to bite into the wall of the recess in the event that the spigot tends to move outwardly, and thus resist such movement.

We claim:

1. A diehead for cutting screw threads comprising a body, means for mounting a plurality of thread chaser carriers for pivotal movement relative to the body about respective spaced parallel axes, means for displacing the mounted carriers angularly about the longitudinal axis of the diehead, means engaged with the mounted carriers to cause said carrier pivotal movement in response to angular displacement of the carriers, constraint means for normally constraining the carrier pivotal movement within a range defined by carrier operative and inoperative positions, pivotally mounted locking means engaged and pivotable with the mounted carriers, and formations respectively on the locking means and carriers which are arranged for interengagement during pivotal movement of the carriers within said range of movement to prevent axial withdrawal of the carriers, said constraint means being operable to release the carriers for further angular displacement and responsive pivotal movement beyond said range of movement, thereby causing the pivotal axes of the locking means and carriers to be relatively displaced to an extent permitting disengagement of said formations and thus axial withdrawal of said carriers from the diehead.

2. A diehead according to claim 1 wherein the carriers are arranged to be released by said locking means for removal when pivotally displaced beyond their inoperative positions.

3. A diehead according to claim 2 wherein the carriers are supported on a face of the body extending perpendicularly to the carrier pivotal axes and said formations co-operate with the carriers adjacent said face.

4. A diehead according to claim 1 wherein said means for displacing the mounted carriers angularly is a ring co-axially mounted on the body and angularly displaceable about the diehead axis, the carriers being mounted on the ring and said locking means pivoted on the body about axes parallel to the carrier pivotal axes.

5. A diehead according to claim 3 wherein each carrier has a slot within which one of said formations is slidably disposed, when the mounted carrier lies within said range of movement, and angular displacement of said ring and responsive pivotal movement of the carriers causes said formations to move clear of the respective slots when the carriers are pivotally moved beyond their inoperative positions.

6. A diehead according to claim 4 wherein the longitudinal axis of each slot, for the mean position of movement of the carriers in said range of movement, lies on a line joining the pivotal axis of the associated carrier with that of the corresponding locking means.

7. A diehead according to claim 1 wherein said constraint means is a releasable detent mechanism.

8. A diehead according to claim 7 wherein the detent mechanism includes a locking element resiliently urged towards a locking position in engagement with said ring and means manually operable to displace said element from its locking position.

9. A diehead according to claim 8 wherein said manually operable means is a plunger arranged so as, when operated, to exert a camming action on the locking element in order to urge it away from said locking position.

10. A diehead according to claim 8 wherein said manually operable means is a rotary member coupled to the locking element in such a manner that rotation of the rotary member urges the locking element away from its locking position.

11. A diehead according to claim 10 wherein the locking element comprises a locking pin having a groove formed therein and the rotary member has an eccentric pin projecting in the direction of the rotary axis of the rotary member and into said groove.

12. A diehead according to claim 1 wherein said means engage with the mounted carriers to cause said carrier pivotal movement in response to angular displacement of the carriers are part of said locking means.

13. A diehead according to claim 4 wherein said ring is spring urged in a direction such that when moved in that direction, said carriers are moved towards their inoperative positions, means being provided which normally act, with the carriers in their operative positions, to prevent said ring moving in said direction but are releasable to permit such movement under the action of the spring.

14. A diehead according to claim 5 wherein angular displacement of the ring to cause pivotal movement of the carriers beyond their inoperative positions is limited by a radially projecting abutment on the ring engaging a peripheral groove in the body.

* * * * *